United States Patent Office.

ROBERT STEINER, OF NEW ORLEANS, LOUISIANA, ASSIGNOR TO UNION OIL REFINING & FUEL COMPANY, OF JEFFERSON COUNTY, TEXAS, A CORPORATION.

PROCESS OF MAKING ARTIFICIAL FUEL.

SPECIFICATION forming part of Letters Patent No. 695,348, dated March 11, 1902.

Application filed November 18, 1901. Serial No. 82,693. (No specimens.)

*To all whom it may concern:*

Be it known that I, ROBERT STEINER, a citizen of the United States, residing at New Orleans, in the parish of Orleans and State of Louisiana, have invented certain new and useful Improvements in Processes of Making Artificial Fuel; and I do hereby declare the following to be a full, clear, and exact description of the invention, such as will enable others skilled in the art to which it appertains to make and use the same.

My invention relates to an improvement in the process of making artificial fuel and the product of said process.

My invention is especially designed to be used in connection with the crude petroleum-oil which is now produced in large quantities in Texas and Louisiana.

In carrying out my process I take the crude petroleum-oil and mix it with about six per cent. of its weight of sawdust and about twelve per cent. of its weight of ordinary earth. I do not confine myself, however, to these exact proportions, which can be varied with considerable limits as required by the particular kind of oil under treatment. This mixture is then placed in an ordinary still and fractionally distilled in the usual way. I separate out the various products of distillation fractionally in the usual way. The lighter products of distillation I use for illuminating purposes, the middle grade I commonly use as a fuel-oil, and the heaviest grade may be used either as a fuel-oil or as a lubricating-oil after further treatment. As soon as the distillation is practically finished, which usually occurs after the still has been heated for some little time to a temperature varying between, say, 450° and 500° centigrade, the heavy residue is withdrawn from the still and while still hot is pressed into briquets or any suitable form by means of an hydraulic or steam press. After these briquets have been allowed to stand and cool for some time they harden and form a very efficient and valuable artificial fuel.

I find that by the use of sawdust alone or by the use of sawdust and earth together mixed with the oil before it is subjected to the distilling process practically all the impurities are kept back in the still, so that the resulting products distilled off can be used for illuminating and heating purposes without further treatment.

Instead of sawdust I may use wood-pulp; but I find it preferable to use a larger percentage of wood-pulp than of sawdust. About ten per cent., by weight, of wood-pulp is suitable for the common quality of petroleum. I also find that the addition of about ten per cent. of strong sulfuric acid before distillation facilitates the process considerably.

Having thus described my invention, what I claim, and desire to secure by Letters Patent of the United States, is—

1. The process of making artificial fuel, which consists in mixing crude petroleum-oil with sawdust and earth, subjecting the mixture to a distilling operation, and pressing the residue into compact masses.

2. The process of making artificial fuel, which consists in mixing crude petroleum-oil with about six per cent. of sawdust and about twelve per cent. of earth, distilling the mixture, and pressing the residue while still hot into compact masses.

3. An artificial fuel, composed of the residuum left after distilling a mixture of crude petroleum-oil, sawdust and earth.

4. An artificial fuel, composed of the residuum left after distilling a mixture of crude petroleum-oil, sawdust and earth molded while hot into a compact mass.

In testimony whereof I affix my signature in presence of two witnesses.

ROBERT STEINER.

Witnesses:
JOHN H. HOLT,
JOS. H. BLACKWOOD.